(12) United States Patent
Chou et al.

(10) Patent No.: US 12,078,730 B2
(45) Date of Patent: Sep. 3, 2024

(54) SINGLE CLICK BOX PREDICTION FOR TEMPORAL LIDAR LABELING AUTOMATION

(71) Applicant: GM Cruise Holdings LLC, San Francisco, CA (US)

(72) Inventors: Meng-Ta Chou, San Francisco, CA (US); Jennifer Villa, Palo Alto, CA (US); Matt Deiters, San Francisco, CA (US); Mesut Arik, San Francisco, CA (US); Radu Dondera, Oakland, CA (US); Yunjing Xu, San Francisco, CA (US)

(73) Assignee: GM Cruise Holdings LLC, San Francisco, CA (US)

( * ) Notice: Subject to any disclaimer, the term of this patent is extended or adjusted under 35 U.S.C. 154(b) by 766 days.

(21) Appl. No.: 17/219,731

(22) Filed: Mar. 31, 2021

(65) Prior Publication Data

US 2022/0317305 A1 Oct. 6, 2022

(51) Int. Cl.
| | |
|---|---|
| *G01S 17/931* | (2020.01) |
| *B60W 60/00* | (2020.01) |
| *G01S 7/48* | (2006.01) |
| *G01S 17/04* | (2020.01) |
| *G01S 17/42* | (2006.01) |
| *G05D 1/00* | (2006.01) |

(52) U.S. Cl.
CPC ....... *G01S 17/931* (2020.01); *B60W 60/0027* (2020.02); *G01S 7/4808* (2013.01); *G01S 17/04* (2020.01); *G01S 17/42* (2013.01); *G05D 1/0251* (2013.01); *G05D 1/0276* (2013.01); *B60W 2420/408* (2024.01); *B60W 2540/215* (2020.02); *B60W 2554/404* (2020.02)

(58) Field of Classification Search
CPC ........ G01S 17/931; G01S 17/04; G01S 17/06; G01S 7/4808; G01S 17/42; G05D 1/0276; G05D 1/0251; B60W 60/0027; B60W 2554/404; B60W 2540/215; B60W 2420/408

See application file for complete search history.

(56) References Cited

U.S. PATENT DOCUMENTS

| | | | | |
|---|---|---|---|---|
| 11,531,113 | B1 * | 12/2022 | Bristow | G06V 20/58 |
| 2021/0078600 | A1 * | 3/2021 | Price | G01C 21/3407 |
| 2022/0188695 | A1 * | 6/2022 | Zhu | G06N 20/00 |
| 2022/0230021 | A1 * | 7/2022 | Muehlenstaedt | G06V 10/7753 |

* cited by examiner

Primary Examiner — Congvan Tran
(74) Attorney, Agent, or Firm — Michael DiCato

(57) ABSTRACT

Methods and systems are provided for predicting temporal Lidar labels with a single click. In some aspects, a process can include steps for receiving point cloud data based on a detected object from an autonomous vehicle, determining an object based on the point cloud data of the detected object and corresponding models related to the detected object, updating the models based on the point cloud data of the detected object and selected object labels, the selected object labels being based on 3D bounding boxes of the detected object, and providing the updated models to the autonomous vehicle for deployment. Systems and machine-readable media are also provided.

17 Claims, 9 Drawing Sheets

SINGLE CLICK BOX PREDICTION FOR TEMPORAL LIDAR LABELING AUTOMATION

BACKGROUND

1. Technical Field

The subject technology provides solutions for facilitating the placement of bounding boxes (e.g., 2D and 3D bounding boxes) around objects (e.g. Lidar objects in 3D), and in particular, for predicting temporal Lidar labels with a single click.

2. Introduction

Processing systems that are configured to perform object recognition often use bounding boxes to identify regions (e.g., scene regions) corresponding with locations of objects of interest. In some conventional processing applications, bounding box placement is performed manually. In these conventional workflows, users are typically responsible for identifying object locations, and for drawing bounding boxes around the object edges (e.g., voxel regions) using a cursor or other input device.

BRIEF DESCRIPTION OF THE DRAWINGS

Certain features of the subject technology are set forth in the appended claims. However, the accompanying drawings, which are included to provide further understanding, illustrate disclosed aspects and together with the description serve to explain the principles of the subject technology. In the drawings:

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form in order to avoid obscuring the concepts of the subject technology.

As described herein, one aspect of the present technology is predicting temporal Lidar labels with a single click.

In autonomous vehicle (AV) deployments, labeling for machine learning models for object detection from Lidar (e.g., the Point Pillars model) consists of defining 3D bounding boxes for objects given the Lidar return points for a scene. The labeling process is expensive, time consuming and tedious. In the case of a temporal sequence of frames captured in a scene, the difficulties are amplified as the 3D bounding box of an object potentially changes throughout the entire length of the sequence (e.g., 200 frames).

Simple geometry based techniques may assist in speeding up single frame labeling to a certain degree, but these techniques also have drawbacks such as requiring a non-trivial amount of interaction and lacking robustness in some cases such as distant objects. For the temporal aspect, simple motion models (e.g., linear models) may assist only for short intervals. Due to errors inherent to machine learning model predictions, leveraging machine learning to make human labeling work more efficient is far from straightforward.

Aspects of the disclosed technology address the foregoing limitations of conventional labeling by providing minimal interaction to generate an annotation in Lidar space. The present disclosure can include an annotation tool that proposes a sequence of 3D bounding boxes across multiple time periods in response to the system receiving a selection such as a click. The present disclosure further contemplates including simple and efficient integration of ML model predictions with a linear interpolation graphic user interface for temporal Lidar labeling. The annotation tool can also allow hierarchical refinement starting from machine learning guessed boxes, instead of requiring labelers to make large corrections in a large number of frames.

As discussed in further detail below, the disclosed technology further contemplates a system workflow that can include: 1) utilizing a technique to extend the spatial range of a machine learning model; 2) utilizing a heuristic tracking-by-detection algorithm; and 3) interpolating temporal Lidar labeling.

Figure 1:
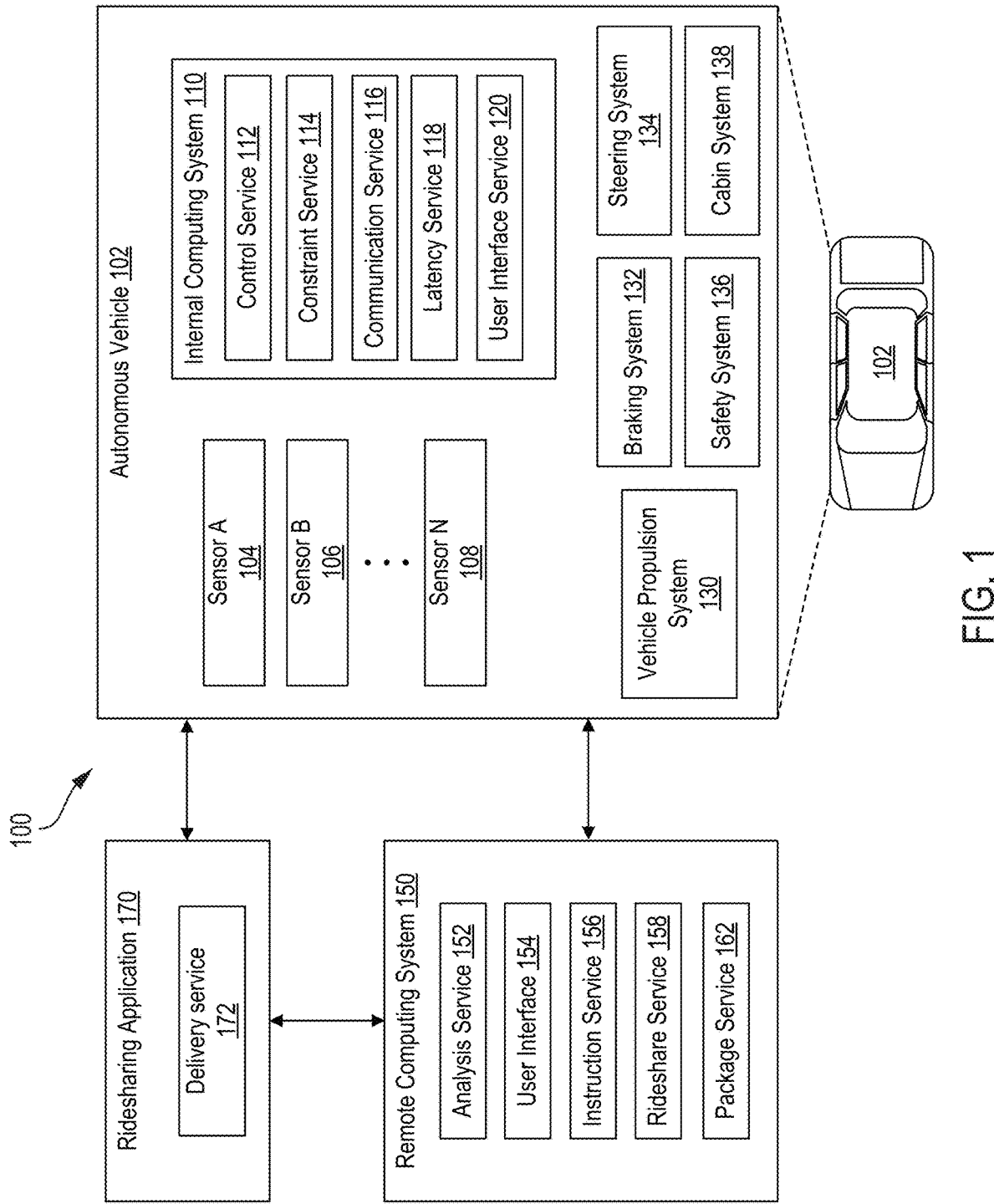
FIG. 1 illustrates an example system environment that can be used to facilitate autonomous vehicle navigation and routing operations, according to some aspects of the disclosed technology.

FIG. 1 illustrates an example system environment 100 that can be used to facilitate AV dispatch and operations, according to some aspects of the disclosed technology. Autonomous vehicle 102 can navigate about roadways without a human driver based upon sensor signals output by sensor systems 104-106 of autonomous vehicle 102. Autonomous vehicle 102 includes a plurality of sensor systems 104-106 (a first sensor system 104 through an Nth sensor system 106). Sensor systems 104-106 are of different types and are arranged about the autonomous vehicle 102. For example, first sensor system 104 may be a camera sensor system and the Nth sensor system 106 may be a Light Detection and Ranging (LIDAR) sensor system. Other exemplary sensor systems include radio detection and ranging (RADAR) sensor systems, Electromagnetic Detection and Ranging (EmDAR) sensor systems, Sound Navigation and Ranging (SONAR) sensor systems, Sound Detection and Ranging (SODAR) sensor systems, Global Navigation Satellite System (GNSS) receiver systems such as Global Positioning System (GPS) receiver systems, accelerometers, gyroscopes, inertial measurement units (IMU), infrared sensor systems, laser rangefinder systems, ultrasonic sensor systems, infrasonic sensor systems, microphones, or a combination thereof. While four sensors 180 are illustrated coupled to the autonomous vehicle 102, it is understood that more or fewer sensors may be coupled to the autonomous vehicle 102.

Autonomous vehicle 102 further includes several mechanical systems that are used to effectuate appropriate motion of the autonomous vehicle 102. For instance, the mechanical systems can include but are not limited to, vehicle propulsion system 130, braking system 132, and steering system 134. Vehicle propulsion system 130 may include an electric motor, an internal combustion engine, or both. The braking system 132 can include an engine brake, brake pads, actuators, and/or any other suitable componentry that is configured to assist in decelerating autonomous vehicle 102. In some cases, braking system 132 may charge a battery of the vehicle through regenerative braking. Steering system 134 includes suitable componentry that is configured to control the direction of movement of the autonomous vehicle 102 during navigation.

Autonomous vehicle 102 further includes a safety system 136 that can include various lights and signal indicators, parking brake, airbags, etc. Autonomous vehicle 102 further includes a cabin system 138 that can include cabin temperature control systems, in-cabin entertainment systems, etc.

Autonomous vehicle 102 additionally comprises an internal computing system 110 that is in communication with sensor systems 180 and systems 130, 132, 134, 136, and 138. Internal computing system 110 includes at least one processor and at least one memory having computer-executable instructions that are executed by the processor. The computer-executable instructions can make up one or more services responsible for controlling autonomous vehicle 102, communicating with remote computing system 150, receiving inputs from passengers or human co-pilots, logging metrics regarding data collected by sensor systems 180 and human co-pilots, etc.

Internal computing system 110 can include a control service 112 that is configured to control operation of vehicle propulsion system 130, braking system 132, steering system 134, safety system 136, and cabin system 138. Control service 112 receives sensor signals from sensor systems 180 as well communicates with other services of internal computing system 110 to effectuate operation of autonomous vehicle 102. In some embodiments, control service 112 may carry out operations in concert one or more other systems of autonomous vehicle 102.

Internal computing system 110 can also include constraint service 114 to facilitate safe propulsion of autonomous vehicle 102. Constraint service 116 includes instructions for activating a constraint based on a rule-based restriction upon operation of autonomous vehicle 102. For example, the constraint may be a restriction upon navigation that is activated in accordance with protocols configured to avoid occupying the same space as other objects, abide by traffic laws, circumvent avoidance areas, etc. In some embodiments, the constraint service can be part of control service 112.

The internal computing system 110 can also include communication service 116. The communication service 116 can include both software and hardware elements for transmitting and receiving signals from/to the remote computing system 150. Communication service 116 is configured to transmit information wirelessly over a network, for example, through an antenna array that provides connectivity using one or more cellular transmission standards, such as long-term evolution (LTE), 3G, 5G, or the like.

In some embodiments, one or more services of the internal computing system 110 are configured to send and receive communications to remote computing system 150 for such reasons as reporting data for training and evaluating machine learning algorithms, requesting assistance from remoting computing system or a human operator via remote computing system 150, software service updates, ridesharing pickup and drop off instructions etc.

Internal computing system 110 can also include latency service 118. Latency service 118 can utilize timestamps on communications to and from remote computing system 150 to determine if a communication has been received from the remote computing system 150 in time to be useful. For example, when a service of the internal computing system 110 requests feedback from remote computing system 150 on a time-sensitive process, the latency service 118 can determine if a response was timely received from remote computing system 150 as information can quickly become too stale to be actionable. When the latency service 118 determines that a response has not been received within a threshold, latency service 118 can enable other systems of autonomous vehicle 102 or a passenger to make necessary decisions or to provide the needed feedback.

Internal computing system 110 can also include a user interface service 120 that can communicate with cabin system 138 in order to provide information or receive information to a human co-pilot or human passenger. In some embodiments, a human co-pilot or human passenger may be required to evaluate and override a constraint from constraint service 114, or the human co-pilot or human passenger may wish to provide an instruction to the autonomous vehicle 102 regarding destinations, requested routes, or other requested operations.

As described above, the remote computing system 150 is configured to send/receive a signal from the autonomous vehicle 140 regarding reporting data for training and evaluating machine learning algorithms, requesting assistance from remote computing system 150 or a human operator via the remote computing system 150, software service updates, rideshare pickup and drop off instructions, etc.

Remote computing system 150 includes an analysis service 152 that is configured to receive data from autonomous vehicle 102 and analyze the data to train or evaluate machine learning algorithms for operating the autonomous vehicle 102. The analysis service 152 can also perform analysis pertaining to data associated with one or more errors or constraints reported by autonomous vehicle 102.

Remote computing system 150 can also include a user interface service 154 configured to present metrics, video, pictures, sounds reported from the autonomous vehicle 102 to an operator of remote computing system 150. User interface service 154 can further receive input instructions from an operator that can be sent to the autonomous vehicle 102.

Remote computing system 150 can also include an instruction service 156 for sending instructions regarding the operation of the autonomous vehicle 102. For example, in response to an output of the analysis service 152 or user interface service 154, instructions service 156 can prepare instructions to one or more services of the autonomous vehicle 102 or a co-pilot or passenger of the autonomous vehicle 102.

Remote computing system 150 can also include rideshare service 158 configured to interact with ridesharing applications 170 operating on (potential) passenger computing devices. The rideshare service 158 can receive requests to be picked up or dropped off from passenger ridesharing app 170 and can dispatch autonomous vehicle 102 for the trip. The rideshare service 158 can also act as an intermediary between the ridesharing app 170 and the autonomous vehicle wherein a passenger might provide instructions to the autonomous vehicle to 102 go around an obstacle, change routes, honk the horn, etc.

As understood by those of skill in the art, machine-learning based classification techniques can vary depending on the desired implementation. For example, machine-learning classification schemes can utilize one or more of the following, alone or in combination: hidden Markov models, recurrent neural networks (RNNs), convolutional neural networks (CNNs); Deep Learning networks, Bayesian symbolic methods, general adversarial networks (GANs), support vector machines, image registration methods, and/or applicable rule-based systems. Where regression algorithms are used, they can include but are not limited to: a Stochastic Gradient Descent Regressors, and/or Passive Aggressive Regressors, etc.

Machine learning classification models can also be based on clustering algorithms (e.g., a Mini-batch K-means clustering algorithm), a recommendation algorithm (e.g., a Miniwise Hashing algorithm, or Euclidean Locality-Sensitive Hashing (LSH) algorithm), and/or an anomaly detection algorithm, such as a Local outlier factor. Additionally, machine-learning models can employ a dimensionality reduction approach, such as, one or more of: a Mini-batch Dictionary Learning algorithm, an Incremental Principal Component Analysis (PCA) algorithm, a Latent Dirichlet Allocation algorithm, and/or a Mini-batch K-means algorithm, etc.

Figure 2:
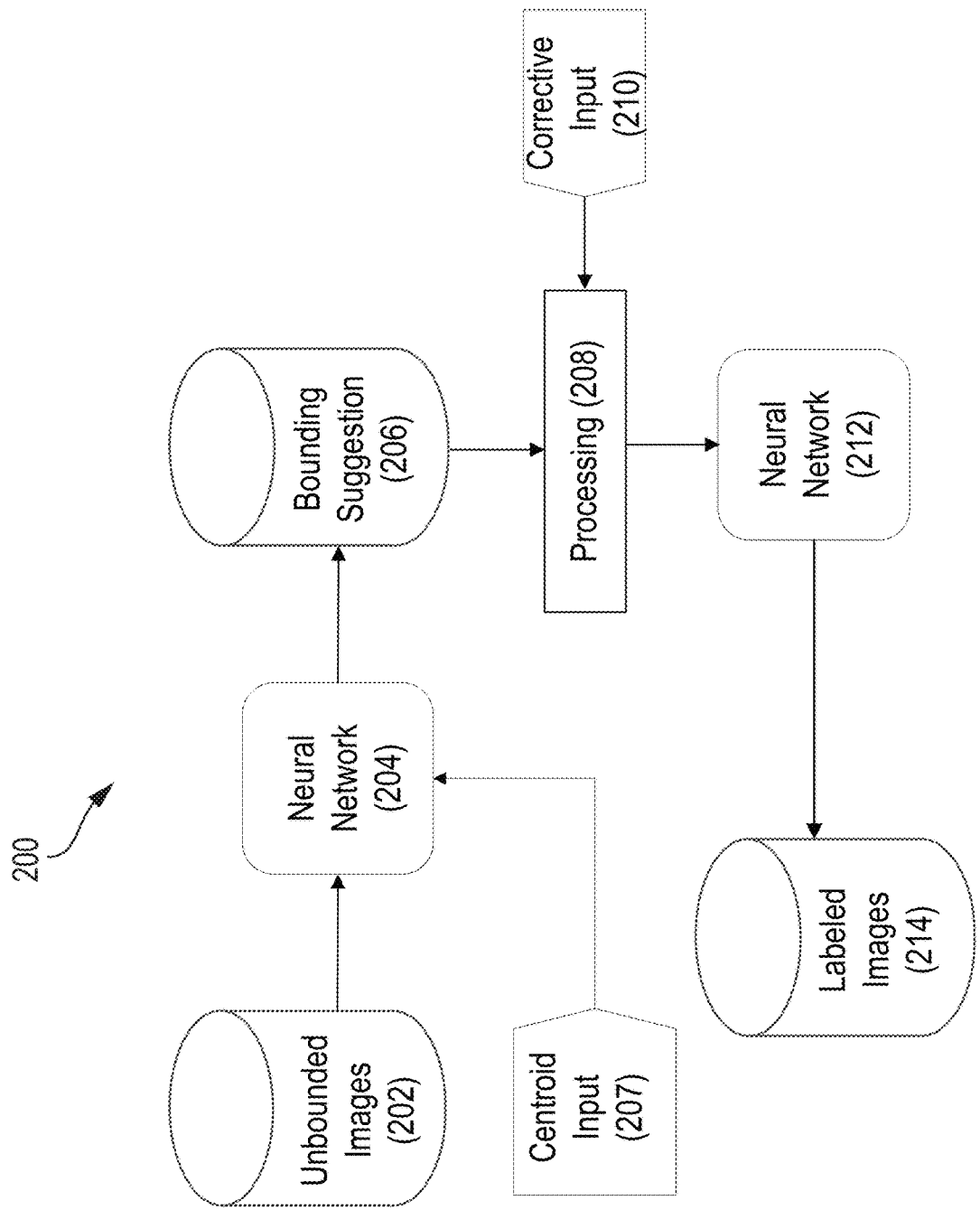
FIG. 2 illustrates an example system that can be used to facilitate bounding box insertion into one or more images, according to some aspects of the disclosed technology.

FIG. 2 illustrates an example system 200 that can be used to facilitate bounding box insertion into one or more images, according to some aspects of the disclosed technology. System 200 includes a repository of unbounded images 202 from which unprocessed (unbounded) images are provided to a neural network 204. Neural network 204 can be configured to receive unbounded images and identify image objects therein. Identification of image objects can include the identification of pixel regions corresponding with various image objects. Neural network 204 can then predict the placement of bounding boxes in relation to one or more image objects, and output bounding box suggestions that are stored to a repository of images containing bounding suggestions, e.g., repository 206.

In some instances, the initial bounding box placements performed by neural network 204 may be accurate. In such instances, acceptance of the inserted bounding box can be indicated with a simple user input, such as the click of a mouse, or pressing of an input key. Alternatively, bounding box placement may require adjusting/editing at processing step 208. As such, corrective inputs 210 can be used to further process the bounded images at processing step 208. By way of example, user (corrective) inputs can be provided to modify the size and/or location of one or more bounding boxes, for example, using a mouse pointer or other input device.

In some implementations, the processed bounding boxes are provided to additional neural-networks 212 or other machine-learning models, for example, to perform semantic classification and labeling for one or more objects in the bounding box areas. In turn, the resulting labeled and bounded objects can be stored to a repository of labeled images 214, for example, for further use by an autonomous vehicle (AV) maneuver stack.

In some aspects, user centroid inputs can also be provided in conjunction with unbounded images as inputs to neural network 204. For example, neural network 204 can be configured to receive an unbounded image from repository 202 together with user inputs that indicate an approximate center (centroid) location of at least one image object in the unbounded image. In some aspects, centroid location information provided by the user can increase accuracy of bounding box insertion in the unbounded images. Similar to the examples provided above, even in instances where user centroid inputs are used to produce initial bounding box insertions/recommendations, later user inputs can still be used to correct or adjust bounding box location and/or sizing.

Figure 3:
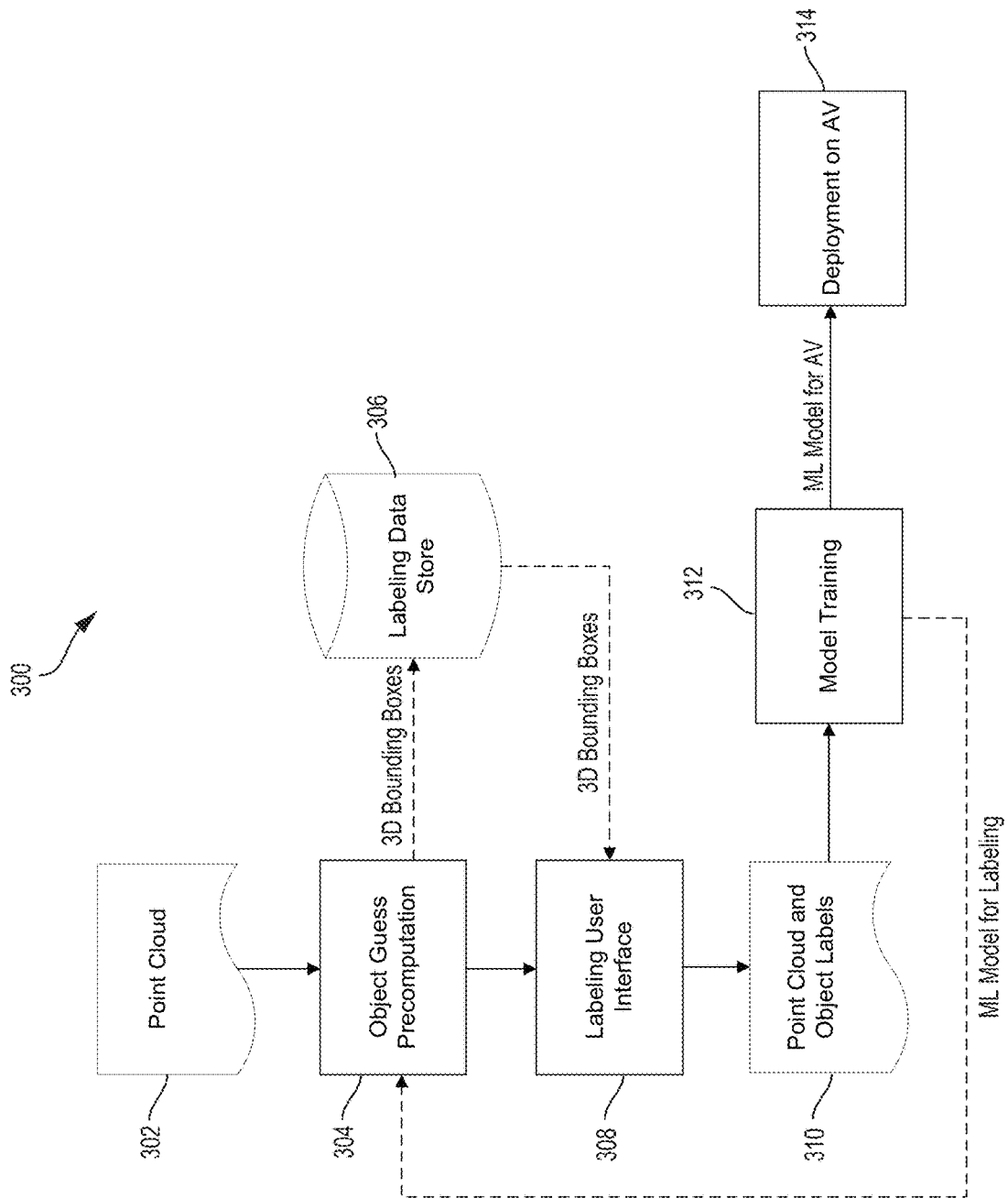
FIG. 3 illustrates an example process of Lidar labeling automation, according to some aspects of the disclosed technology.

FIG. 3 illustrates an example process of Lidar labeling automation 300, according to some aspects of the disclosed technology. In some implementations, process 300 can include a technique that significantly extends a spatial range of a machine learning model for object detection from a single Lidar frame. For example, process 300 can tile a large square around the autonomous vehicle (e.g., 200×200 m) into smaller tiles (e.g., 50×50 m) and build models specific to groups of tiles (e.g., 4 inner band tiles and 12 outer band tiles). At runtime, object detection in the large range can be performed by process 300 by running the tile group specific models and concatenating their output.

Process 300 begins with step 302, in which a point cloud or point cloud data by a Lidar labeling automation system. Point cloud 302 of process 300 can include sets of points that describe an object or surface. For example, point cloud 302 can be generated by utilizing laser scanning technology such as Lidar. Each point of point cloud 302 can contain data that can be integrated with other data sources or used to generate 3D models of detected objects.

Thereafter, process 300 may advance to step 304, in which a precomputation process can be performed to guess an object based on the point cloud data. For example, when an object is detected by the Lidar labeling automation system, point cloud data of the detected object can be received and precomputation processes performed to determine an initial guess of what the detected object may be. The precomputation process of step 304 can be processed by a processor as described herein. Step 304 of process 300 may further include generating 3D or 2D bounding boxes around the detected object based on the precomputation processes. For example, process 300 can leverage a machine learning models such as a bird's eye view (BEV) models, PointPillar models (e.g., organizing point clouds into vertical columns), or any other machine learning models suitable for the intended purpose and understood by a person of ordinary skill in the art. Step 304 of process 300 can also include training short-distance machine learning models and long-distance machine learning models. The short-distance machine learning models can be utilized for the "4 inner band tiles," while the long-distance machine learning models can be utilized for the "12 outer band tiles" as described herein. Machine learning models outputs can then be filtered (e.g., based on confidence score, etc.) and then concatenated.

Process 300 may then advance to step 306, in which labeling data store can be utilized by the Lidar labeling automation system. In some implementations, the 3D bounding boxes generated at step 304 can be received at the labeling data store. Thereafter, labels from the labeling data store can be combined with the 3D bounding boxes that were generated at step 304. The labels and 3D bounding boxes may then be provided to a labeling user interface at step 308. The labeling data store can receive 3D bounding boxes from step 304 according to versioned schemas. The versioned schema can contain the 3D bounding box attributes such as dimension, position, orientation, classification, and confidence. The versioned schema can also be updated based on data requirements for future implementation. The precomputation processor of step 304 and the labeling data store (e.g., labeling data storage) can be highly scalable infrastructures (e.g., a messaging service such as publish-subscribe ("pubSub") and a cloud object store) to accommodate both the generation and consumption of load spikes.

Thereafter, process 300 may advance to step 308, in which a labeling user interface may receive data from step 306. In some implementations, the labeling user interface may receive labels and 3D bounding boxes from the labeling data store at step 306. Step 308 of process 300 may further include receiving the initial determination of the guessed object from step 304. The labeling user interface may be utilized by a labeler or a user to determine whether the guessed object precomputation of step 304 and the 3D bounding boxes and labels of step 306 are correct.

The labeling user interface can include a graphical user interface that can present the guessed object precomputation of step 304 and the 3D bounding boxes and labels of step 306 to the labeler. The labeling user interface can further include receiving selections, clicks, or any other interaction from the labeler that is suitable for the intended purpose and understood by a person of ordinary skill in the art. For example, the labeler can provide an input to determine whether the presented guessed object, 3D bounding box, and/or labels are consistent with the detected object. In other implementations, interactions received by the labeling user interface can be provided to step 310 along with point cloud data and object labels.

The provided click in the labeling user interface of step 308 can also be utilized to query for the "best-guess" 3D bounding boxes from the guessed object precomputation of step 304. A query strategy can be based on a plurality of circumstances such as the guessed object's distance from the click, the confidence score from the precomputation output, and the weighted mix of the guessed object and the confidence score (e.g., determining the guessed object with the highest confidence within the 1 meter sphere around the clicked point). Moreover, the labeling user interaction can provide options to filter out guessed objects based on attributes such as classification or dimension of the guessed object.

The labeling user interface at step 308 is not only limited to receiving clicks or selections from a labeling user, but rather, the labeling user interface can also include hovering. For example, when the labeling user interface enters a specified mode (e.g., via a hotkey), the hovering on or over a target area can trigger previews of guessed object precomputation queries. Once the preview of the guessed object is satisfactory (e.g., reaching a predetermined threshold or satisfactory to the labeler) the labeler can use another user interaction (e.g., a click) to persist the preview into a real label.

Process 300 may then advance to step 310, in which point cloud data and object labels can be combined. In some implementations, point cloud data can be received from step 302 and corresponding object labels from the labeling data store at step 306. Step 310 of process 300 can further include receiving interactions or selections received by the labeling user interface at step 308.

Thereafter, process 300 may advance to step 312, in which machine learning model training may be utilized by the Lidar labeling automation system. At step 312, model training can include receiving the point cloud data from step 302 of the detected object, the guessed object precomputation and 3D bounding boxes of step 304, labels from step 306 that correspond to the 3D bounding boxes received from step 304, interactions or selections received by the labeling user interface at step 308, and/or the combination of point cloud data and object labels from step 310. By receiving the above-mentioned data from steps 302-310 of process 300, step 312 can include updating or revising stored models (e.g., model training and retraining) to provide better and improved models to step 304, which can then be utilized to better determine the type of the object detected by the autonomous vehicle. Once an appropriate machine learning model is determined to be satisfactory, the machine learning model can then be provided to the autonomous vehicle or an autonomous vehicle fleet at step 314.

Process 300 may then advance to step 314, in which a machine learning model for an autonomous vehicle is deployed by the autonomous vehicle. The machine learning model deployed by the autonomous vehicle may be the machine learning model received from step 312.

Figure 4:
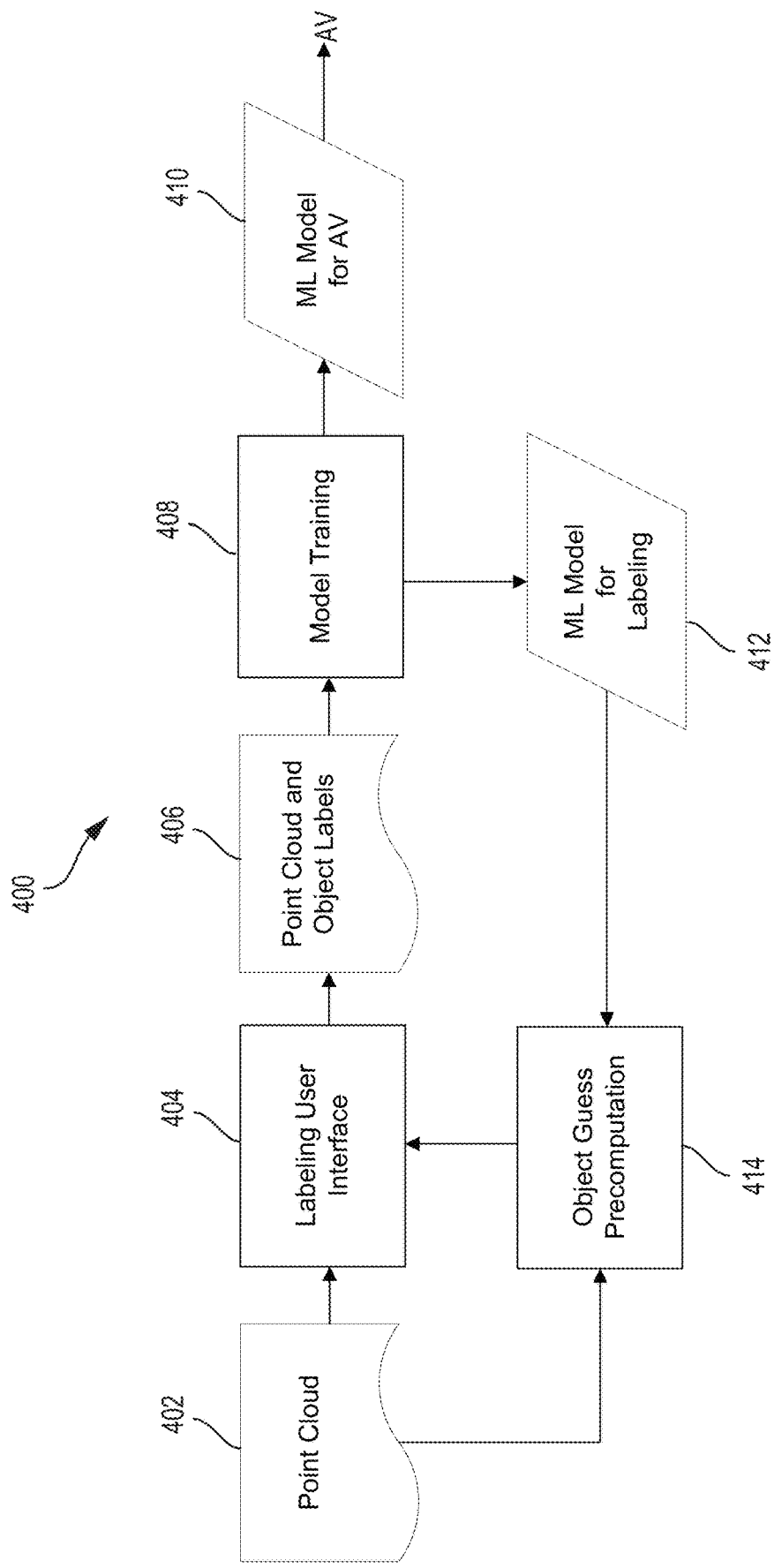
FIG. 4 illustrates another example process of Lidar labeling automation, according to some aspects of the disclosed technology.

FIG. 4 illustrates another example process of Lidar labeling automation 400, according to some aspects of the disclosed technology. Similar to the Lidar labeling automation of FIG. 3, FIG. 4 begins with step 402, in which point cloud data relating to a detected object is received by a Lidar labeling automation system. Thereafter, process 400 may advance to step 404, in which the point cloud data is received at a labeling user interface. As described herein, the labeling user interface can receive interactions or selections by a labeler or user (e.g., a single click on a 3D bounding box). Process 400 may then advance to step 406, in which the point cloud data and object labels are combined. Thereafter, process 400 can advance to step 408, in which model training can take place including receiving the point cloud data, labeling user interface selections, and/or object labels from steps 402-406. Process 400 can then advance to step 412, in which a machine learning model for labeling is provided to step 414. Thereafter, process 400 can advance to step 414, in which the Lidar labeling automation system can determine by precomputation the type of the detected object based on stored machine learning models and/or the machine learning model for labeling received from step 412. Step 414 of process 400 can further receive point cloud data from step 402 to identify the detected object. The identified object can then be provided to the labeling user interface of step 404. Process 400 can then advance to step 410, in which a machine learning model for an autonomous vehicle is provided to the autonomous vehicle to be deployed accordingly.

Figure 5:
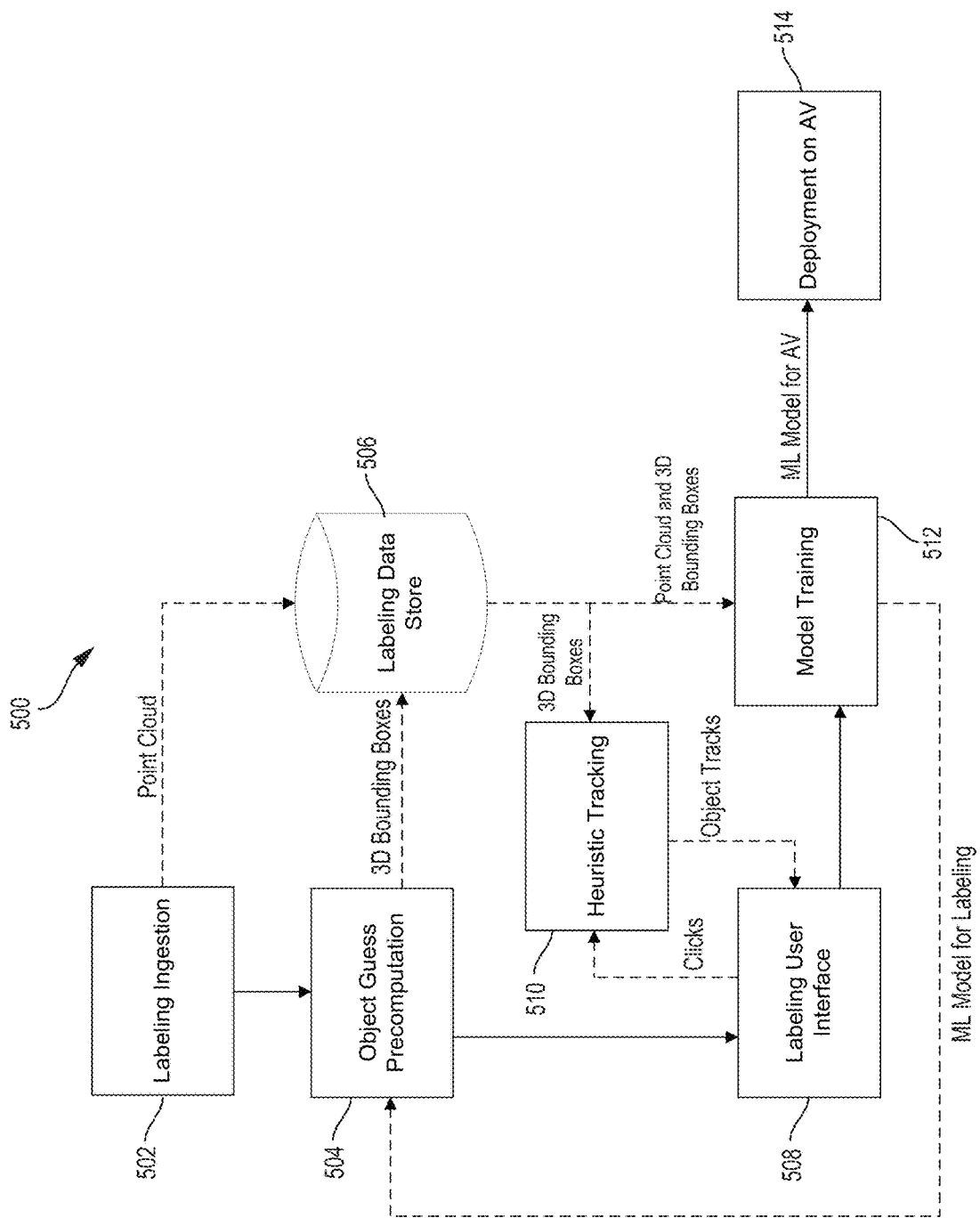
FIG. 5 illustrates an example process of temporal Lidar labeling automation, according to some aspects of the disclosed technology.

FIG. 5 illustrates an example process temporal Lidar labeling automation 500, according to some aspects of the disclosed technology. Process 500 of FIG. 5 is similar to process 300 of FIG. 3 with the inclusion of step 510, in which a Lidar labeling automation system utilizes heuristic tracking, as further described herein.

Process 500 begins with step 502, in which label ingestion is conducted by the Lidar labeling automation system. For example, labels and point clouds can be received by the Lidar labeling automation system. In other implementations, point clouds can be received by the Lidar labeling automation system from autonomous vehicles of an autonomous vehicle fleet. In some implementations, point cloud data can be received at step 502 and provided to step 506 of process 500.

Thereafter, process 500 may advance to step 504, in which a precomputation process can be performed to guess an object based on data received from step 502 relating to labeling ingestion and/or point cloud data of the detected object. For example, when an object is detected by the Lidar labeling automation system, labeling ingestion and/or point cloud data of the detected object can be received and precomputation processes performed to determine an initial guess of what the detected object may be. Step 504 of process 500 may further include generating 3D or 2D bounding boxes around the detected object based on the precomputation processes. The generated 3D bounding boxes may then be provided to the labeling data store of step 506. In some implementations, step 504 can include providing data relating to the initial guess of the detected object to the labeling user interface of step 508.

Process 500 may then advance to step 506, in which labeling data store can be utilized by the Lidar labeling automation system. In some implementations, the 3D bounding boxes generated at step 504 and the point cloud data of step 502 can be received at the labeling data store at step 506. Thereafter, the labeling data store can provide the 3D bounding boxes from step 504 to the heuristic tracking system of step 510. The labeling data store may further provide the 3D bounding boxes from step 504 and the point cloud data from step 502 to a model training system of step 512.

Thereafter, process 500 may advance to step 510, in which the heuristic tracking system is utilized by the Lidar labeling automation system. At step 510 of process 500, the heuristic tracking system can receive 3D bounding boxes from the labeling data store of step 506. The heuristic tracking system may further receive "clicks" (e.g., interactions or selections form a labeler or user) from step 508, as discussed herein. The heuristic tracking system may then generate object tracks (e.g., FIG. 7) that can be provided to the labeling user interface of step 508.

In some implementations, the heuristic tracking system process 500 can utilize a heuristic tracking-by-detection algorithm. Process 500 can include receiving single frame object predictions from a machine learning model, and when a cue is received (e.g., the UI feature below), process 500 can produce a single object track across time (e.g., FIG. 7). The track can be built incrementally, going forward and back in time and associating predictions based on a simple motion model and prediction scores. Process 500 can also estimate object velocity for the motion model from predictions in previous frames, which can be tracked through a small number of frames without predictions. Moreover, process 500 can include smoothing out predicted 3D bounding box centers and orientations. The tracking may introduce small additional errors in individual frames, but overall the tracking reduces the number of large errors across frame sequences.

In other implementations, process 500 can include a user interface (UI) feature and efficient workflow. For example, for each object, the user interface can support generating an object track, with 3D bounding boxes moving across long periods (e.g., hundreds of frames), in response to a labeler clicking its 2D center in the ground plane. Keyframe boxes can be automatically proposed, and in between them, the user interface can apply an interpolation algorithm.

The heuristic tracking system, as described herein, can include heuristic tracking links, 3D bounding boxes across a plurality of frames (e.g., time frames) along with motion models that account for object motions and noise smoothing. For example, in a first or current frame, the heuristic tracking system can utilize an algorithm that analyzes the object's motion (e.g., both rotational and translational motions) from previous frames. Using the object's motion, the algorithm can predict approximately where the object will be in the next frame. The algorithm of the heuristic tracking system can further query for a best-guess precomputed 3D bounding box at the predicted location of the object in the next frame based on factors including confidence, classification, and distance. If a precomputed 3D bounding box for the object is not available for the next frame (e.g., the heuristic tracking system is unable to determine the location of the object in the next frame), the algorithm of the heuristic tracking system can extend the motion model, to the frames after the next frame, to predict where the object may be in the frames after the next frame (e.g., up to tolerance level of a maximum number of frames). If there are any existing manually labeled 3D boxes in the segment, the Lidar labeling automation system can also incorporate the manually labeled 3D boxes into the motion model by "stitching" the manually labeled 3D boxes with the precomputed 3D boxes. The process at step 510, utilizing the heuristic tracking system, can further be repeated until either the end of the segment or when no precomputed 3D boxes can be found within the missing detection frames tolerance. The process at step 510, utilizing the heuristic tracking system, can further be utilized forward-in-time or backward-in-time to track the object across the entire segment. For example, if the current frame is frame 0, the heuristic tracking system can utilize the algorithm as described herein to track the object ten frames forward and back of frame 0 (e.g., ±10 frames).

Regarding a "single click" that can be utilized at the labeling user interface, the Lidar labeling automation system can query for an initial guessed 3D box from the precomputation 504 based on the click point (e.g., where the click occurs in the frame). Then, using the initial guessed 3D box's position and orientation, the Lidar labeling automation system can query for the object's guessed 3D boxes, forwards and backwards in time, as described herein. Since there may not be sufficient motion information from only 1 3D bounding box, the queries aforementioned can be performed with increased tolerances for attributes such as distance and/or confidence. After more object guessed 3D boxes for the object across time are generated, the Lidar labeling automation system can then utilize the heuristic tracking system at step 510 to complete the remaining object tracking across an entire segment (e.g., entire time segment).

Process 500 may then advance to step 508, in which the labeling user interface may receive data from steps 504, 510. In some implementations, the labeling user interface may receive the initial determination of the guessed object from step 504. The labeling user interface may further receive object tracks generated by the heuristic tracking system of step 510. The labeling user interface can further include receiving selections, clicks, or any other interaction from the labeler that is suitable for the intended purpose and understood by a person of ordinary skill in the art. For example, the labeler can provide an input to determine whether the presented guessed object, 3D bounding box, and/or labels are consistent with the detected object. In other implementations, interactions received by the labeling user interface can be provided to the heuristic tracking system of step 510.

Thereafter, process 500 may advance to step 512, in which machine learning model training may be utilized by the Lidar labeling automation system. At step 512, model training can include receiving the point cloud data from step 502 of the detected object, the guessed object precomputation and 3D bounding boxes of step 504, labels from step 506 that correspond to the 3D bounding boxes received from step 504, interactions or selections received by the labeling user interface at step 508, and/or the combination of point cloud data and 3D bounding boxes from step 506. By receiving the above-mentioned data from steps 502-508 of process 500, step 512 can include updating or revising stored models (e.g., model training and retraining) to provide better and improved models to step 504, which can then be utilized to better determine the type of the object detected by the autonomous vehicle. Once an appropriate machine learning model is determined to be satisfactory, the machine learning model can then be provided to the autonomous vehicle or an autonomous vehicle fleet at step 514.

Process 500 may then advance to step 514, in which a machine learning model for an autonomous vehicle is deployed by the autonomous vehicle. The machine learning model deployed by the autonomous vehicle may be the machine learning model received from step 512.

Figure 6:
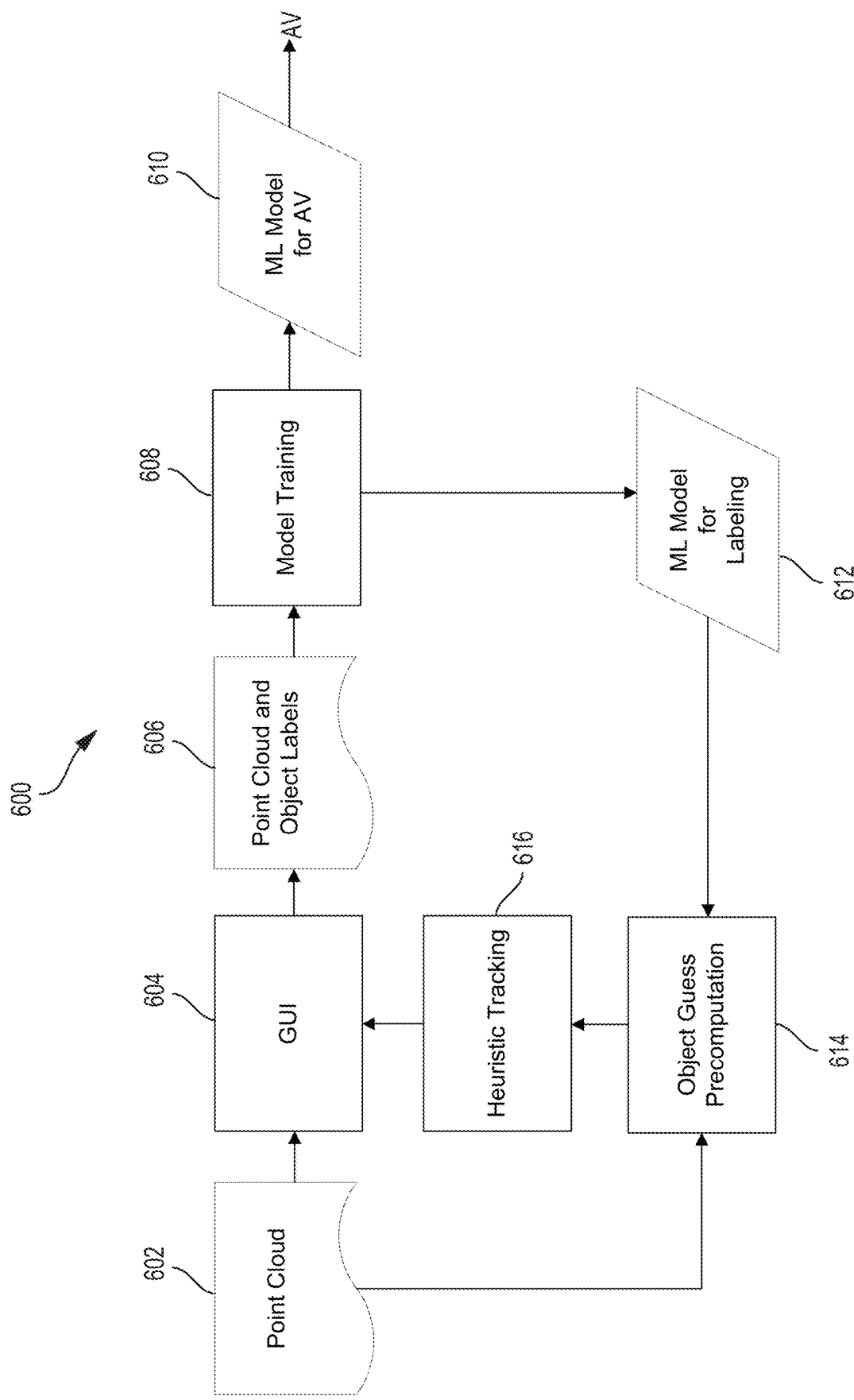
FIG. 6 illustrates another example process of temporal Lidar labeling automation, according to some aspects of the disclosed technology.

FIG. 6 illustrates another example process of Lidar labeling automation 600, according to some aspects of the disclosed technology. Similar to the Lidar labeling automation of FIG. 5, FIG. 6 begins with step 602, in which point cloud data relating to a detected object is received by a Lidar labeling automation system. Thereafter, process 600 may advance to step 604, in which the point cloud data is received at a graphical user interface (e.g., a labeling user interface). As described herein, the labeling user interface can receive interactions or selections by a labeler or user (e.g., a single click on point cloud data). Process 600 may then advance to step 606, in which the point cloud data and object labels are combined. Thereafter, process 600 can advance to step 608, in which model training can take place including receiving the point cloud data, labeling user interface selections, and/or object labels from steps 602-606. Process 600 can then advance to step 612, in which a machine learning model for labeling is provided to step 614. Thereafter, process 600 can advance to step 614, in which the Lidar labeling automation system can determine by precomputation the type of the detected object based on stored machine learning models and/or the machine learning model for labeling received from step 612. Step 614 of process 600 can further receive point cloud data from step 602 to identify the detected object. The identified object can then be provided to a heuristic tracking system of step 616. In some implementations, object tracks can be generated by the heuristic tracking system and provided to the graphical user interface of step 604, to be potentially provided to a labeler. Process 600 can then advance to step 610, in which a machine learning model for an autonomous vehicle is provided to the autonomous vehicle to be deployed accordingly.

Figure 7:
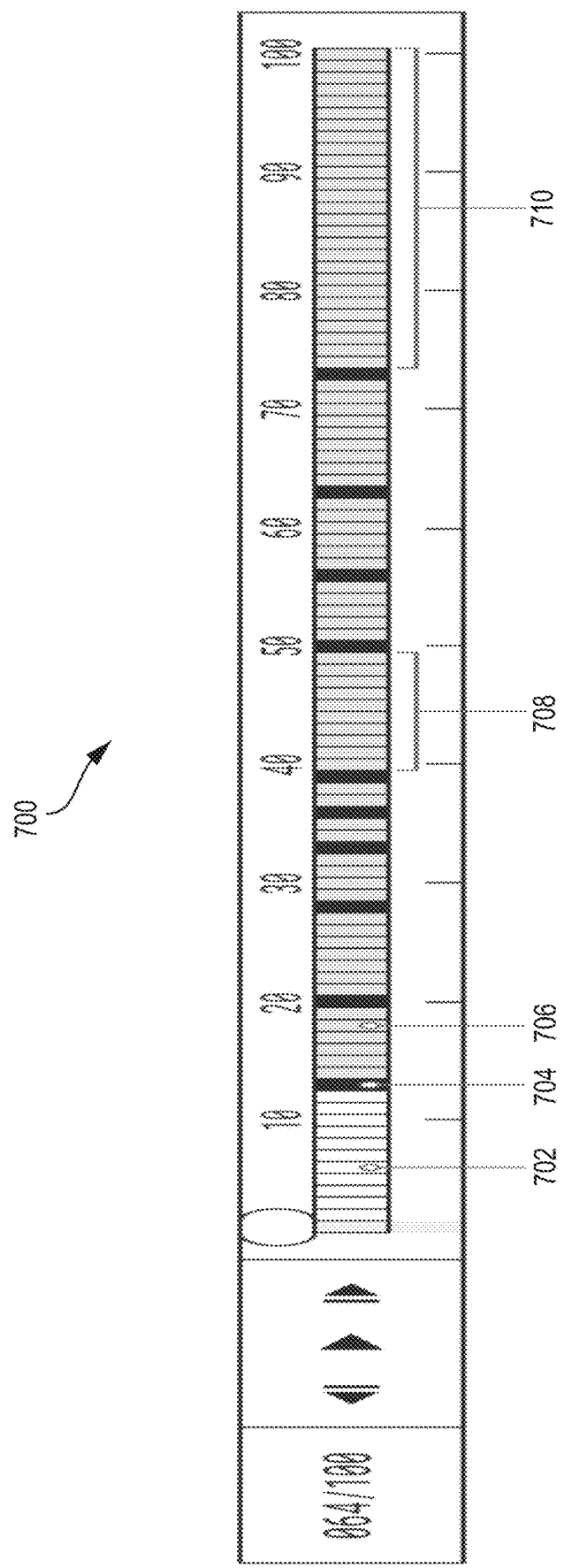
FIG. 7 illustrates an example interpolation overview, according to some aspects of the disclosed technology.

FIG. 7 illustrates an example interpolation overview 700, according to some aspects of the disclosed technology. Interpolated frames 700 of a timeline includes frames without an artifact 702 (e.g., where an object does not exist), a keyframe 704, an auto-artifact 706, an interpolation group 708 (e.g., bound by 2 keyframes), and a propagation group 710 (e.g., bound by 1 keyframe only, at either end of the timeline).

Artifact 702 of interpolated frames 700, in the context of data labeling for machine learning, can include any human-drawn shape meant to represent a real-life object and track the real-life object over multiple frames. For example, this can be a Lidar box in Lidar labeling tasks 306 or an image box in image labeling tasks.

Keyframe 704 of interpolated frames 700 can be artifacts whose shape, size, position, and orientation are utilized to inform the shape, size, position, and orientation of surrounding non-keyframe artifacts. For example, keyframe 704 can be any artifact that was manually generated or edited by a labeler. Labeler touch can be utilized as a signal that the artifact's shape, size, position, and orientation have been reviewed and are reliable.

Auto-artifact 706 of interpolated frames 700, or non-keyframe artifact, can be any artifact that was automatically generated and/or modified by the system and processes as described herein. Auto-artifact 706 may also be unedited by a labeler.

Interpolation group 708 of interpolated frames 700 may be generated by a process of interpolation. For example, interpolation can be the process of gradually modifying the shape, size, position, and/or orientation of auto-artifacts between two keyframes, based on the shape, size, position, and orientation of these keyframes. Linear and smart interpolation may be utilized between keyframes. Interpolation group 708 can be a group of interpolated keyframes between two specific keyframes.

Propagation group 710 of interpolated frames 700 is a variant of interpolation that occurs when a group of auto-artifacts is bound by only one keyframe. This may occur when the group is at the beginning or end of the timeline. Propagation may include copying the shape, size, position, and orientation of the closest keyframe to all the auto-artifacts in the group. Propagation group 710 can be a group of propagated keyframes between either end of the timeline and the closest keyframe.

In some implementations, interpolation interactions can include any artifact created or manually edited by labelers to automatically become a keyframe. Whenever the first keyframe for an object is manually generated (e.g., drawn by a labeler), the entire timeline is populated with auto-artifacts that are a copy of that keyframe (e.g., propagation). In other instances, whenever a user edits an auto-artifact, the auto-artifact becomes a keyframe. Editing an artifact can include changing its shape, size, position, or orientation, or anything other gradual property that an artifact may have.

Whenever a new keyframe is generated, auto-artifacts surrounding that keyframe can be instantly re-interpolated or re-propagated. Users can press a button or hotkey to turn the selected auto-artifact into a keyframe, without having to manually edit the keyframe. Users can also press a button or hotkey to delete a selected interpolation or propagation group. Users can further press a hotkey to navigate the timeline, N frames at a time. Users can press a hotkey to navigate the timeline by jumping from keyframe to keyframe. This interpolation interaction can allow the labeler to interact with fewer total frames, thereby saving time and cost.

In other implementations, the interpolation interaction may determine how auto-artifacts are computed between keyframes. For example, linear interpolation linearly adjusts the properties of auto-artifacts between two keyframes. Smart interpolation can leverage sensor inputs (e.g., Lidar points) between two keyframes and a motion model of objects in the world to better predict the optimal position of auto-artifacts. Smart interpolation may include some amount of linear interpolation to assist in smoothing the position of auto-artifacts. The labeling process may further be expedited by combining interpolation with machine learning-assisted labeling.

Figure 8:
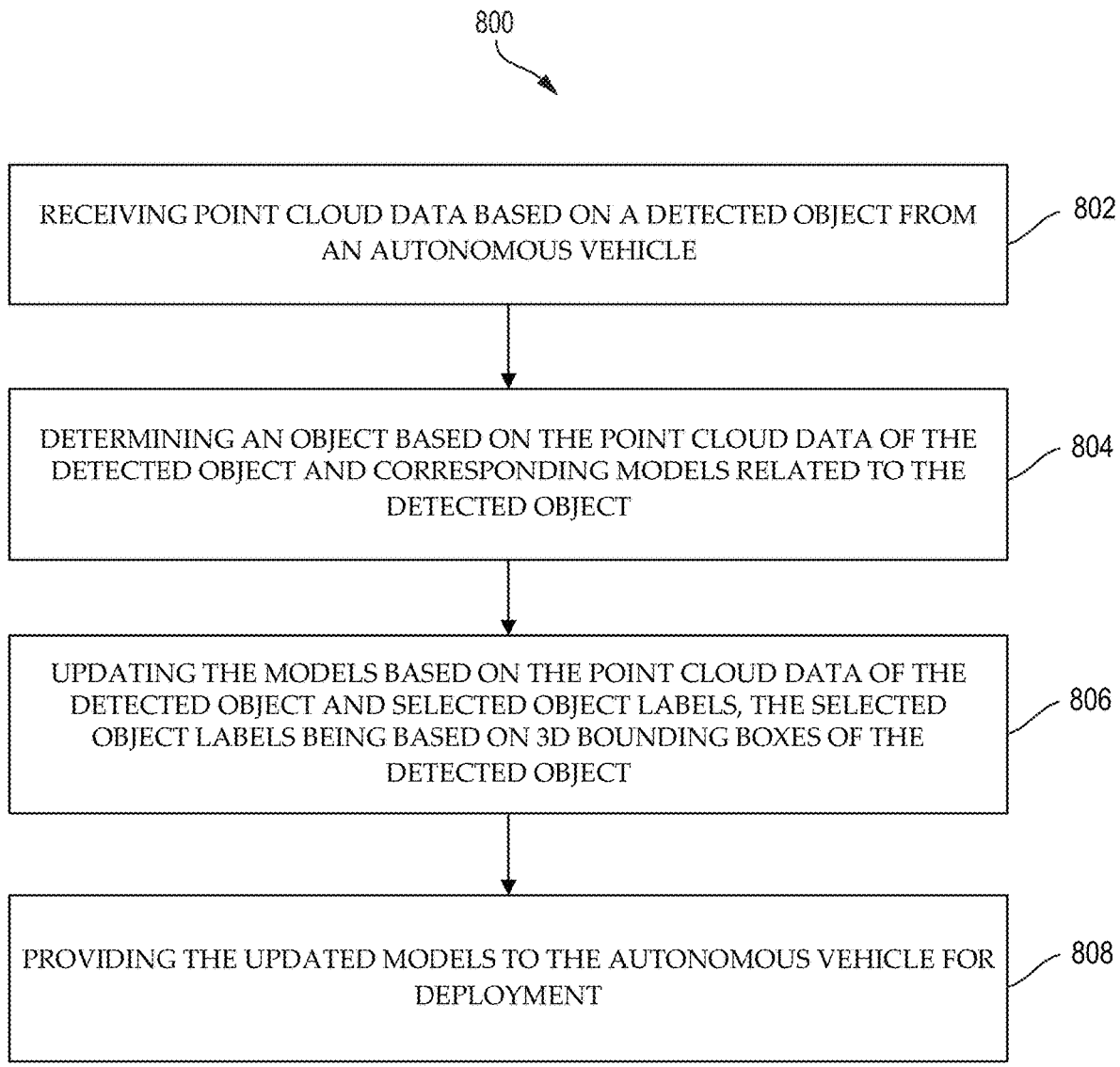
FIG. 8 illustrates an example process of Lidar labeling automation, according to some aspects of the disclosed technology.

Having disclosed some example system components and concepts, the disclosure now turns to FIG. 8, which illustrates an example method 800 for predicting temporal Lidar labels with a single click. The steps outlined herein are exemplary and can be implemented in any combination thereof, including combinations that exclude, add, or modify certain steps.

At step 802, method 800 can include receiving, at a labeling automation system, point cloud data based on a detected object from an autonomous vehicle.

At step 804, method 800 can include determining, by the labeling automation system, an object based on the point cloud data of the detected object and corresponding models related to the detected object. The determined object can be determined based on input from a labeling user interface with only one click.

At step 806, method 800 can include updating, by the labeling automation system, the models based on the point cloud data of the detected object and selected object labels, the selected object labels being based on 3D bounding boxes of the detected object.

At step 808, method 800 can include providing, by the labeling automation system, the updated models to the autonomous vehicle for deployment.

Method 800 can further include providing, by the labeling automation system, the 3D bounding boxes to a labeling data store of the labeling automation system.

Method 800 can also include providing, by the labeling automation system, the 3D bounding boxes and a selection from a labeling user interface to a heuristic tracking system of labeling automation system. In some instances, method 800 can include generating, by the labeling automation system, an object track based on the 3D bounding boxes and the selection from the labeling user interface. The object track can include a plurality of frames of the detected object across a period of time. The selection from the labeling user interface can include a single click to a 2D center of a ground plane of the object track.

Figure 9:
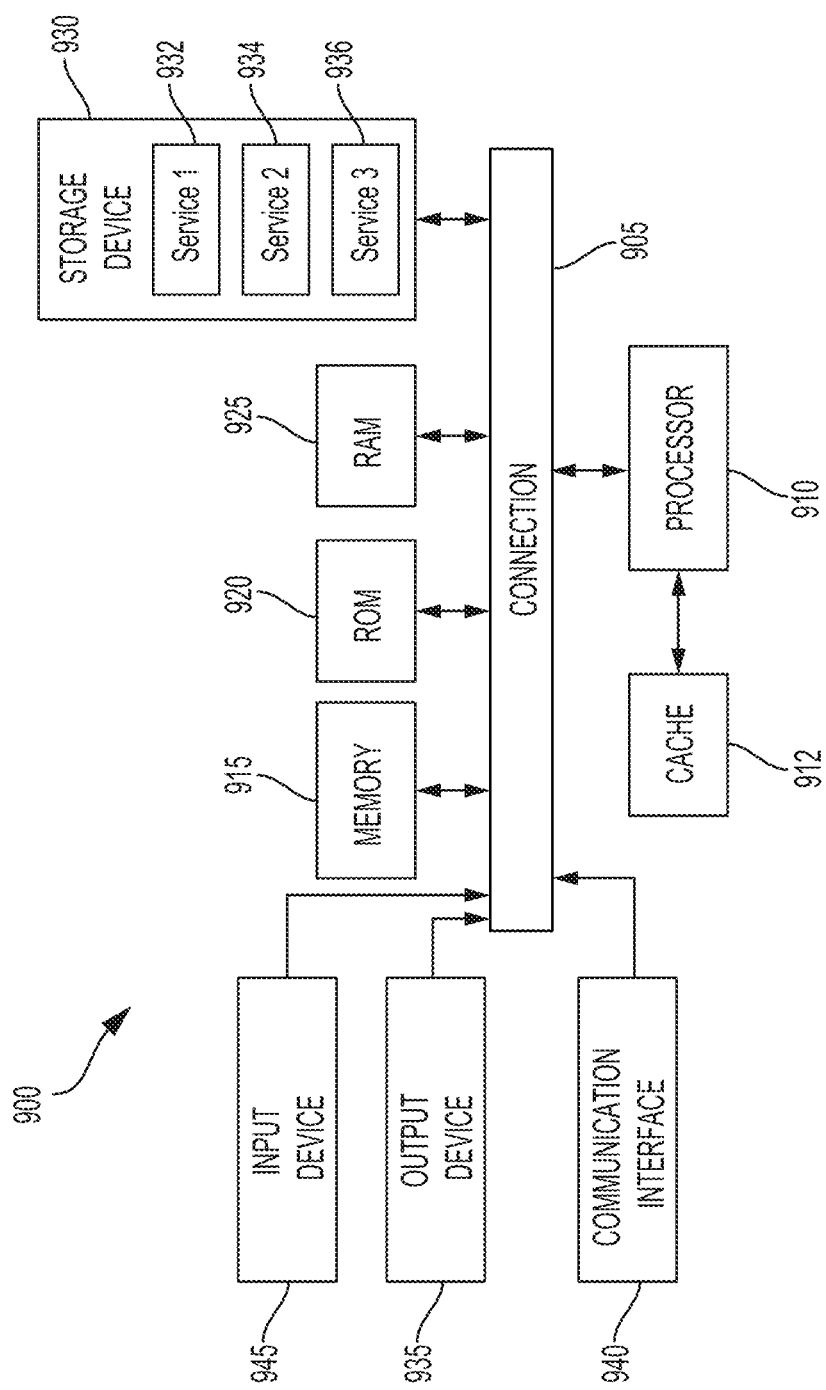
FIG. 9 illustrates an example processor-based system with which some aspects of the subject technology can be implemented.

FIG. 9 illustrates an example processor-based system with which some aspects of the subject technology can be implemented. For example, processor-based system 900 that can be any computing device making up internal computing system 110, remote computing system 150, a passenger device executing the rideshare app 170, internal computing device 130, or any component thereof in which the components of the system are in communication with each other using connection 905. Connection 905 can be a physical connection via a bus, or a direct connection into processor 910, such as in a chipset architecture. Connection 905 can also be a virtual connection, networked connection, or logical connection.

In some embodiments, computing system 900 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 900 includes at least one processing unit (CPU or processor) 910 and connection 905 that couples various system components including system memory 915, such as read-only memory (ROM) 920 and random-access memory (RAM) 925 to processor 910. Computing system 900 can include a cache of high-speed memory 912 connected directly with, in close proximity to, and/or integrated as part of processor 910.

Processor 910 can include any general-purpose processor and a hardware service or software service, such as services 932, 934, and 936 stored in storage device 930, configured to control processor 910 as well as a special-purpose processor where software instructions are incorporated into the actual processor design. Processor 910 may essentially be a completely self-contained computing system, containing multiple cores or processors, a bus, memory controller, cache, etc. A multi-core processor may be symmetric or asymmetric.

To enable user interaction, computing system 900 includes an input device 945, which can represent any number of input mechanisms, such as a microphone for speech, a touch-sensitive screen for gesture or graphical input, keyboard, mouse, motion input, speech, etc. Computing system 900 can also include output device 935, which can be one or more of a number of output mechanisms known to those of skill in the art. In some instances, multimodal systems can enable a user to provide multiple types of input/output to communicate with computing system 900. Computing system 900 can include communications interface 940, which can generally govern and manage the user input and system output. The communication interface may perform or facilitate receipt and/or transmission wired or wireless communications via wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof.

Communications interface 940 may also include one or more Global Navigation Satellite System (GNSS) receivers or transceivers that are used to determine a location of the computing system 900 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 930 can be a non-volatile and/or non-transitory computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L #), resistive random-access memory (RRAM/ReRAM), phase change memory (PCM), spin transfer torque RAM (STT-RAM), another memory chip or cartridge, and/or a combination thereof.

Storage device 930 can include software services, servers, services, etc., that when the code that defines such software is executed by the processor 910, it causes the system to perform a function. In some embodiments, a hardware service that performs a particular function can include the software component stored in a computer-readable medium in connection with the necessary hardware components, such as processor 910, connection 905, output device 935, etc., to carry out the function.

As understood by those of skill in the art, machine-learning based classification techniques can vary depending on the desired implementation. For example, machine-learning classification schemes can utilize one or more of the following, alone or in combination: hidden Markov models; recurrent neural networks; convolutional neural networks (CNNs); deep learning; Bayesian symbolic methods; general adversarial networks (GANs); support vector machines; image registration methods; applicable rule-based system. Where regression algorithms are used, they may include including but are not limited to: a Stochastic Gradient Descent Regressor, and/or a Passive Aggressive Regressor, etc.

Machine learning classification models can also be based on clustering algorithms (e.g., a Mini-batch K-means clustering algorithm), a recommendation algorithm (e.g., a Miniwise Hashing algorithm, or Euclidean Locality-Sensitive Hashing (LSH) algorithm), and/or an anomaly detection algorithm, such as a Local outlier factor. Additionally, machine-learning models can employ a dimensionality reduction approach, such as, one or more of: a Mini-batch Dictionary Learning algorithm, an Incremental Principal Component Analysis (PCA) algorithm, a Latent Dirichlet Allocation algorithm, and/or a Mini-batch K-means algorithm, etc.

Embodiments within the scope of the present disclosure may also include tangible and/or non-transitory computer-readable storage media or devices for carrying or having computer-executable instructions or data structures stored thereon. Such tangible computer-readable storage devices can be any available device that can be accessed by a general purpose or special purpose computer, including the functional design of any special purpose processor as described above. By way of example, and not limitation, such tangible computer-readable devices can include RAM, ROM, EEPROM, CD-ROM or other optical disk storage, magnetic disk storage or other magnetic storage devices, or any other device which can be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general purpose computer, special purpose computer, or special purpose processing device to perform a certain function or group of functions. By way of example computer-executable instructions can be used to implement perception system functionality for determining when sensor cleaning operations are needed or should begin. Computer-executable instructions also include program modules that are executed by computers in stand-alone or network environments. Generally, program modules include routines, programs, components, data structures, objects, and the functions inherent in the design of special-purpose processors, etc. that perform tasks or implement abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules can be located in both local and remote memory storage devices.

The various embodiments described above are provided by way of illustration only and should not be construed to limit the scope of the disclosure. For example, the principles herein apply equally to optimization as well as general improvements. Various modifications and changes may be made to the principles described herein without following the example embodiments and applications illustrated and described herein, and without departing from the spirit and scope of the disclosure. Claim language reciting "at least one of" a set indicates that one member of the set or multiple members of the set satisfy the claim.

What is claimed is:
1. A computer-implemented method comprising:
receiving, at a labeling automation system, point cloud data based on a detected object from an autonomous vehicle;
determining, by the labeling automation system, an object based on the point cloud data of the detected object and corresponding models related to the detected object;

updating, by the labeling automation system, the models based on the point cloud data of the detected object and selected object labels, the selected object labels being based on 3D bounding boxes of the detected object;
providing, by the labeling automation system, the updated models to the autonomous vehicle for deployment; and
providing, by the labeling automation system, the 3D bounding boxes and a selection from a labeling user interface to a heuristic tracking system of labeling automation system.

2. The computer-implemented method of claim 1, further comprising providing, by the labeling automation system, the 3D bounding boxes to a labeling data store of the labeling automation system.

3. The computer-implemented method of claim 1, wherein the selected object labels is selected from a labeling user interface with only one click.

4. The computer-implemented method of claim 1, further comprising generating, by the labeling automation system, an object track based on the 3D bounding boxes and the selection from the labeling user interface.

5. The computer-implemented method of claim 4, wherein the object track includes a plurality of frames of the detected object across a period of time.

6. The computer-implemented method of claim 4, wherein the selection from the labeling user interface includes a single click to a 2D center of a ground plane of the object track.

7. A labeling automation system comprising:
one or more processors; and
at least one computer-readable storage medium having stored therein instructions which, when executed by the one or more processors, cause the labeling automation system to:
receive point cloud data based on a detected object from an autonomous vehicle;
determine an object based on the point cloud data of the detected object and corresponding models related to the detected object;
update the models based on the point cloud data of the detected object and selected object labels, the selected object labels being based on 3D bounding boxes of the detected object; and
provide the updated models to the autonomous vehicle for deployment,
wherein the instructions which, when executed by the one or more processors, cause the system to provide the 3D bounding boxes and a selection from a labeling user interface to a heuristic tracking system of labeling automation system.

8. The labeling automation system of claim 7, wherein the instructions which, when executed by the one or more processors, cause the system to provide the 3D bounding boxes to a labeling data store of the labeling automation system.

9. The labeling automation system of claim 7, wherein selected object labels is selected from a labeling user interface with only one click.

10. The labeling automation system of claim 7, wherein the instructions which, when executed by the one or more processors, cause the system to generate an object track based on the 3D bounding boxes and the selection from the labeling user interface.

11. The labeling automation system of claim 10, wherein the object track includes a plurality of frames of the detected object across a period of time.

12. The labeling automation system of claim 10, wherein the selection from the labeling user interface includes a single click to a 2D center of a ground plane of the object track.

13. A non-transitory computer-readable storage medium comprising:
instructions stored on the non-transitory computer-readable storage medium, the instructions, when executed by one more processors, cause the one or more processors to:
receive, at a labeling automation system, point cloud data based on a detected object from an autonomous vehicle;
determine an object based on the point cloud data of the detected object and corresponding models related to the detected object;
update the models based on the point cloud data of the detected object and selected object labels, the selected object labels being based on 3D bounding boxes of the detected object; and
provide the updated models to the autonomous vehicle for deployment;
wherein the instructions, when executed by the one more processors, cause the one or more processors to provide the 3D bounding boxes and a selection from a labeling user interface to a heuristic tracking system of labeling automation system.

14. The non-transitory computer-readable storage medium of claim 13, wherein the instructions, when executed by the one more processors, cause the one or more processors to provide the 3D bounding boxes to a labeling data store of the labeling automation system.

15. The non-transitory computer-readable storage medium of claim 13, wherein the selected object labels is selected from a labeling user interface with only one click.

16. The non-transitory computer-readable storage medium of claim 13, wherein the instructions, when executed by the one more processors, cause the one or more processors to generate an object track based on the 3D bounding boxes and the selection from the labeling user interface.

17. The non-transitory computer-readable storage medium of claim 16, wherein the object track includes a plurality of frames of the detected object across a period of time, wherein the selection from the labeling user interface includes a single click to a 2D center of a ground plane of the object track.

* * * * *